(12) United States Patent
Kiraly (10) Patent No.: US 8,483,462 B2
(45) Date of Patent: Jul. 9, 2013

(54) OBJECT CENTRIC DATA REFORMATION WITH APPLICATION TO RIB VISUALIZATION

(75) Inventor: Atilla P. Kiraly, Plainsboro, NJ (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 1060 days.

(21) Appl. No.: 11/763,026

(22) Filed: Jun. 14, 2007

(65) Prior Publication Data

US 2008/0107318 A1    May 8, 2008

Related U.S. Application Data

(60) Provisional application No. 60/864,187, filed on Nov. 3, 2006.

(51) Int. Cl.
*G06K 9/00* (2006.01)
(52) U.S. Cl.
USPC ............................ 382/131; 382/128; 600/407
(58) Field of Classification Search
USPC .................................. 382/128, 131; 600/407
See application file for complete search history.

(56) References Cited

U.S. PATENT DOCUMENTS

| 6,798,412 | B2 * | 9/2004 | Cowperthwaite | 345/428 |
| 7,646,902 | B2 * | 1/2010 | Chan et al. | 382/128 |
| 2005/0207630 | A1 * | 9/2005 | Chan et al. | 382/131 |
| 2005/0240094 | A1 * | 10/2005 | Pichon et al. | 600/407 |
| 2006/0013482 | A1 * | 1/2006 | Dawant et al. | 382/173 |
| 2006/0062425 | A1 * | 3/2006 | Shen et al. | 382/100 |
| 2006/0173271 | A1 * | 8/2006 | Shen et al. | 600/407 |
| 2006/0173272 | A1 * | 8/2006 | Qing et al. | 600/407 |
| 2006/0228009 | A1 * | 10/2006 | Fidrich et al. | 382/128 |

OTHER PUBLICATIONS

Shen et al., "Tracing Based Segmentation for the Labeling of Individual Rib Structures in Chest CT Volume Data", 2004, Springer, 967-974.*
Li et al., "Level Set Evolution Without Re-initialization: A New Variational Formulation" 2005, IEEE, CVPR '05.*
Chiang et al., "Detection of Pulmonary Embolism: Comparison of Paddlewheel and Coronal CT Reformations-Initial Experience", Radiology, vol. 228, No. 2, 577-582. Aug. 2003.
Kiraly et al., "Cartwheel Projections of Segmented Pulmonary Vasculature for the Detection of Pulmonary Embolism", SPIE Medical Imaging, 2005.
Kiraly, et al., "A novel visualization method for the ribs within chest volume data", Proceedings of SPIE-vol. 6141, Medical Imaging 2006: Visualization, Image-Guided Procedures, and Display, Kevin R. Cleary, Robert L. Galloway, Jr., Editors.
Kiraly, et al., "2D display of a 3D tree for pulmonary embolism detection", CARS 2005.

* cited by examiner

*Primary Examiner* — Jason M Repko
*Assistant Examiner* — Katrina Fujita (57) ABSTRACT

A computer-implemented method for visualizing components of a 3D medical image includes the steps of performing a segmentation on the 3D medical image to generate a segmented structure, obtaining a surface definition based upon the segmented structure, and generating a series of 2D images using the surface definition and deformations of the surface definition.

20 Claims, 6 Drawing Sheets

OBJECT CENTRIC DATA REFORMATION WITH APPLICATION TO RIB VISUALIZATION

CROSS-REFERENCE TO RELATED APPLICATIONS

This application claims priority to U.S. Provisional Application No. 60/864,187, filed on Nov. 3, 2006, the disclosure of which is incorporated by reference herein.

BACKGROUND OF THE INVENTION

1. Technical Field

The present disclosure relates generally to the field of medical imaging, and, more particularly, to the automatic generation of multiple curved Multi-Planar Reformation (MPR) views to reformat the data into a form more suitable for analyzing particular objects or anatomical structures within the image.

2. Discussion of the Related Art

Current imaging modalities such as chest CT can create a wealth of data that can be difficult to analyze by physicians. Reformatting the data into a more concise form can enable a radiologist to quickly analyze portions of the data. Simple plane or slab reformations have been shown to offer benefits in pulmonary embolism (PE) detection. More complex techniques involve making use of a centerline as a basis for generating MPR views. In one such technique, ribs are segmented and their centerlines are determined to offer a concise visualization of the ribs. A similar technique was applied to vessel centerlines for PE detection within the lungs.

While these reformation techniques can offer speed and reliability without complexity, they have limited flexibility. Methods that make use of centerlines offer the potential for more concise visualization, but can suffer from errors during potentially complex preprocessing steps. Further, use of a centerline requires that the centerline be defined as prerequisite before any preprocessing can begin. In addition, any errors in the preprocessing are directly inherited by the final visualization. For example, errors from missing centerlines can create missing ribs or arteries in the final visualization. While manually defining an MPR plane is possible, it can be impractical with even a moderately complex image due to the time required.

Thus, there exists a need for a method and a system for automatically generating curved MPR views based on segmented structures or an evolving surface.

SUMMARY OF THE INVENTION

According to an exemplary embodiment of the present invention, a computer-implemented method for visualizing components of a 3D medical image is provided. The method includes the steps of performing a segmentation on the 3D medical image to generate a segmented structure, obtaining a surface definition based upon the segmented structure, and generating a series of 2D images using the surface definition and deformations of the surface definition. The method may include a step of stacking the series of 2D images to form a new 3D volume, where each 2D image is obtained through a deformation or recreation of the surface definition. The method may also include a step of combining a plurality of the series of 2D images to obtain a new 2D image. The 3D medical image may include a computed tomography (CT) image.

The surface definition may be obtained by generating a distance map from the segmented structure and selecting an iso-surface from the distance map. The distance map may be obtained by applying a fast marching method to the segmented structure. The method may further include steps of selecting a new iso-surface from the distance map and generating a new 2D image using points derived from the new iso-surface. This process of selecting a new iso-surface is one possible way of performing of deformation of the surface definition.

Each of the 2D images may be generated by sampling points of a surface of the 3D medical image. The 2D images may be used for computer aided detection of abnormalities. The 2D images may also be used to generate segmentations of additional anatomic structures.

The performing of the segmentation on the 3D medical image to generate a segmented structure may include applying a level set function to the 3D medical image or performing a seeded region growing operation on the 3D medical image.

For the purpose of visualizing ribs, the segmented structure may include a first segmented structure representative of a first lung of a pair of lungs and a second segmented structure representative of a second lung of the pair and the 2D images may be used to form straightened images of the ribs.

According to an exemplary embodiment of the present invention, a program storage device readable by machine, tangibly embodying a program of instructions executable by the machine to perform method steps for visualizing components of a 3D medical image, is provided. The method includes the steps of performing a segmentation on the 3D medical image to generate a segmented structure, obtaining a surface definition based upon the segmented structure, and generating a series of 2D images using the surface definition and deformations of the surface definition.

According to an exemplary embodiment of the present invention, a computer implemented-method for generating a visualization of a series of 2D images of ribs is provided. The method includes the steps of performing a segmentation on a 3D medical image of a pair of lungs to generate a first segmented structure and a second segmented structure, generating a first distance map from the first segmented structure and a second distance map from the second segmented structure, selecting a first iso-surface from the first distance map and a second iso-surface from the second distance map, generating a connected iso-surface by connecting the first iso-surface to the second iso-surface, and generating 2D images of the ribs using points derived from the connected iso-surface. Additional 2D images may be obtained by deforming the connected iso-surface. The first iso-surface may be connected to the second iso-surface along their closest or intersecting points. The 3D image may include a computed tomography (CT) image.

The visualization may be used for a computer aided diagnosis application to detect abnormalities of the ribs. The visualization may also be used as a basis to perform a segmentation of the ribs. The visualization may also be used for direct interpretation by a radiologist. The generating of the first distance map from the first segmented structure and the second distance map from the second segmented structure may include a step of applying a fast marching method to the first segmentation and the second segmentation.

According to an exemplary embodiment of the present invention, a computerized system for visualizing an image is provided. The system includes a segmentation unit, a surface defining unit, and an image generation unit. The segmentation unit is used to perform a segmentation on a three-dimensional (3D) image of an anatomical object to generate a segmented structure. The surface defining unit is used to generate a surface definition based upon the segmented structure. The image generation unit is used to generate a series of 2D images from the surface definition and deformations of the surface definition.

The surface defining unit is responsible for defining a surface and performing any necessary deformations. The surface defining unit may include a conversion unit and a selection unit. The conversion unit may be used to generate a distance map from the surface definition. The selection unit may be used to select an iso-surface from the distance map.

These and other exemplary embodiments will be described or become more apparent from the following detailed description of exemplary embodiments, which is to be read in connection with the accompanying figures.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF EXEMPLARY EMBODIMENTS

In general, exemplary embodiments of the invention as described in further detail hereafter include systems and methods which visualize an image, such as a curved Multiplanar Reformation (MPR), based on segmented structures or an evolving surface within a given multi-dimensional image.

Exemplary systems and methods which visualize an image based on segmented structures or an evolving surface will now be discussed in further detail with reference to illustrative embodiments of FIGS. 1-5. It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Figure 1:
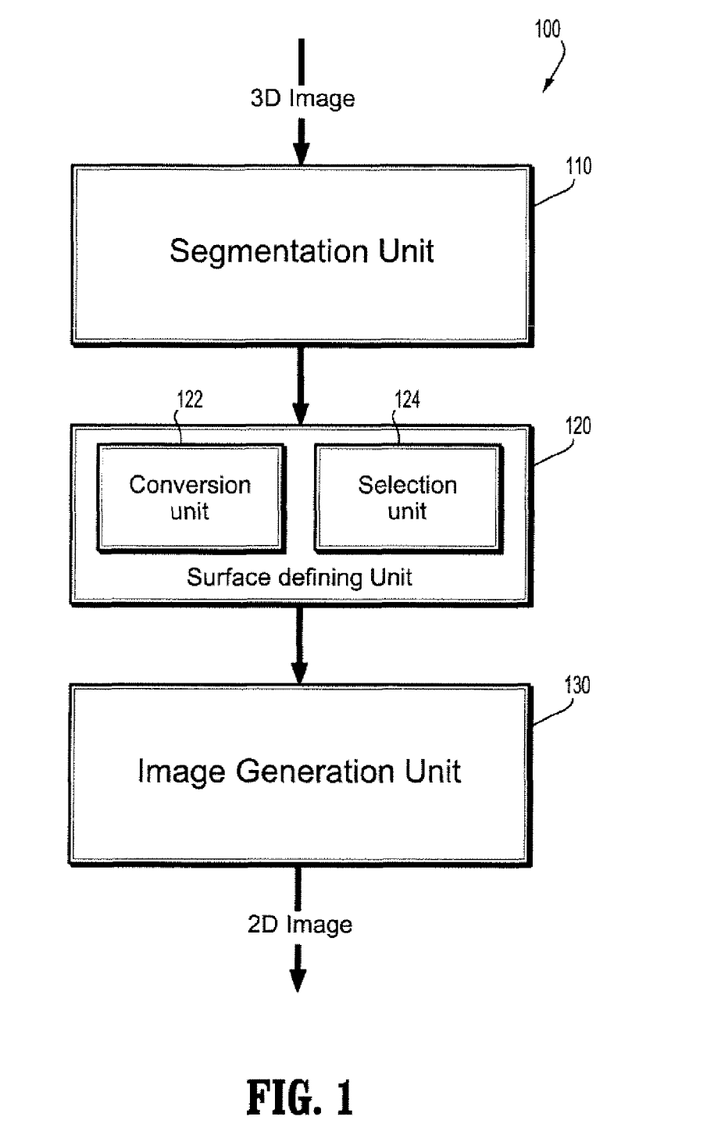
FIG. 1 illustrates a high-level block diagram of a system that visualizes an image, according to an exemplary embodiment of the present invention.
Figure 2A:
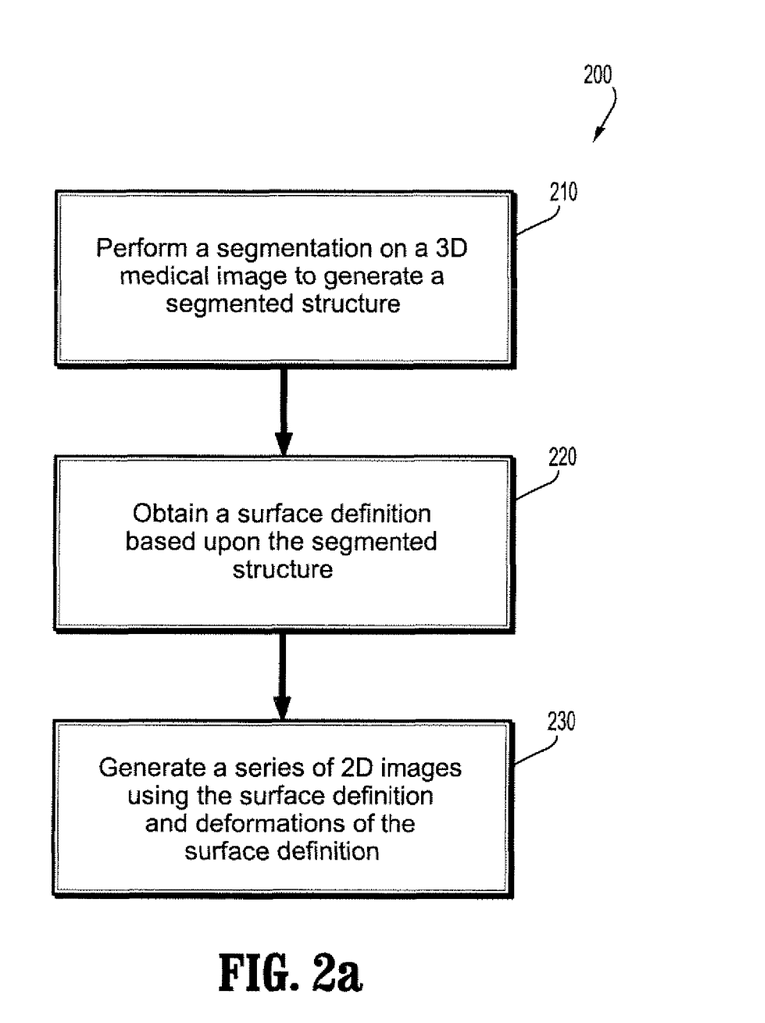
FIG. 2a illustrates a computer-implemented method of visualizing an image 200, according to an exemplary embodiment of the present invention.
Figure 2B:
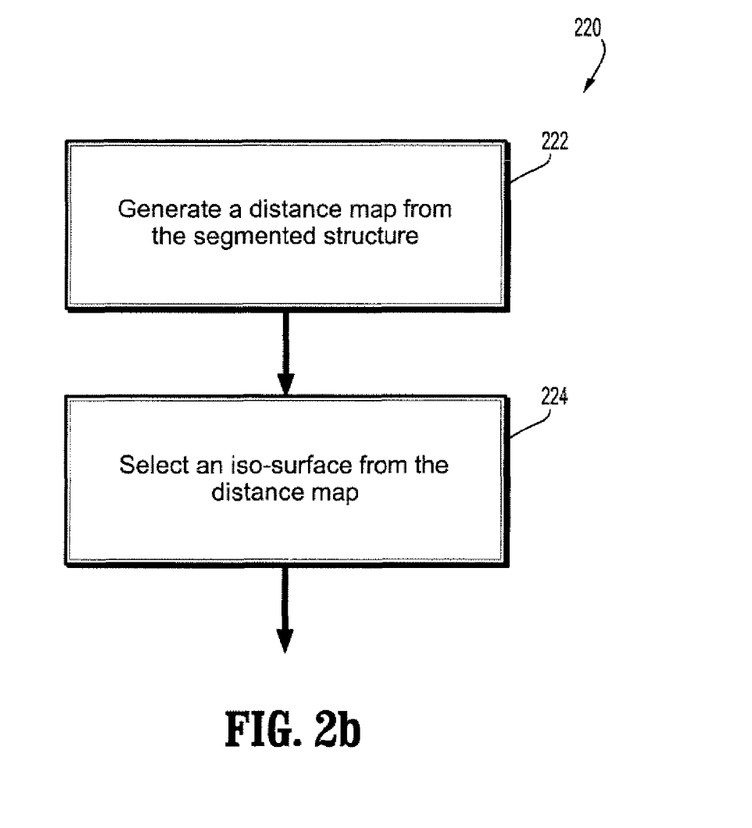
FIG. 2b illustrates a computer-implemented method of obtaining a surface definition for the method of FIG. 2a, according to an exemplary embodiment of the present invention.

FIG. 1 illustrates a high-level block diagram of a computerized system 100 that visualizes an image by reformatting the original volume, according to an exemplary embodiment of the present invention. FIG. 2a illustrates a computer-implemented method of visualizing an image, according to an exemplary embodiment of the present invention. FIG. 2b illustrates a computer-implemented method of obtaining a surface definition for the method of FIG. 2a, according to an exemplary embodiment of the present invention.

FIGS. 1, 2a, and 2b will be discussed together below, because the methods illustrated in FIGS. 2a and 2b may be executed on the system of FIG. 1. However, the methods are not limited to the system illustrated in FIG. 1, and may be executed on any appropriate computer system.

The computerized system 100 includes a segmentation unit 110, a surface defining unit 120, and an image generation unit 130. The segmentation unit 110 receives a 3D image as input and performs a segmentation on the image to generate a segmented structure (210). The surface defining unit 120 receives the segmented structure and obtains a surface definition from the segmented structure (220). The image generation unit 130 receives the surface definition as input and generates a series of 2D images using the surface definition and deformations of the surface definition (230).

The surface defining unit may include a conversion unit 122 and a selection unit 124. The conversion unit 122 receives the segmented structure as input and generates a distance map from the segmented structure (222). The selection unit 124 receives the distance map as input and selects an iso-surface from the distance map to generate the surface definition (224). Again, this is an example of a deformation.

Figure 3:
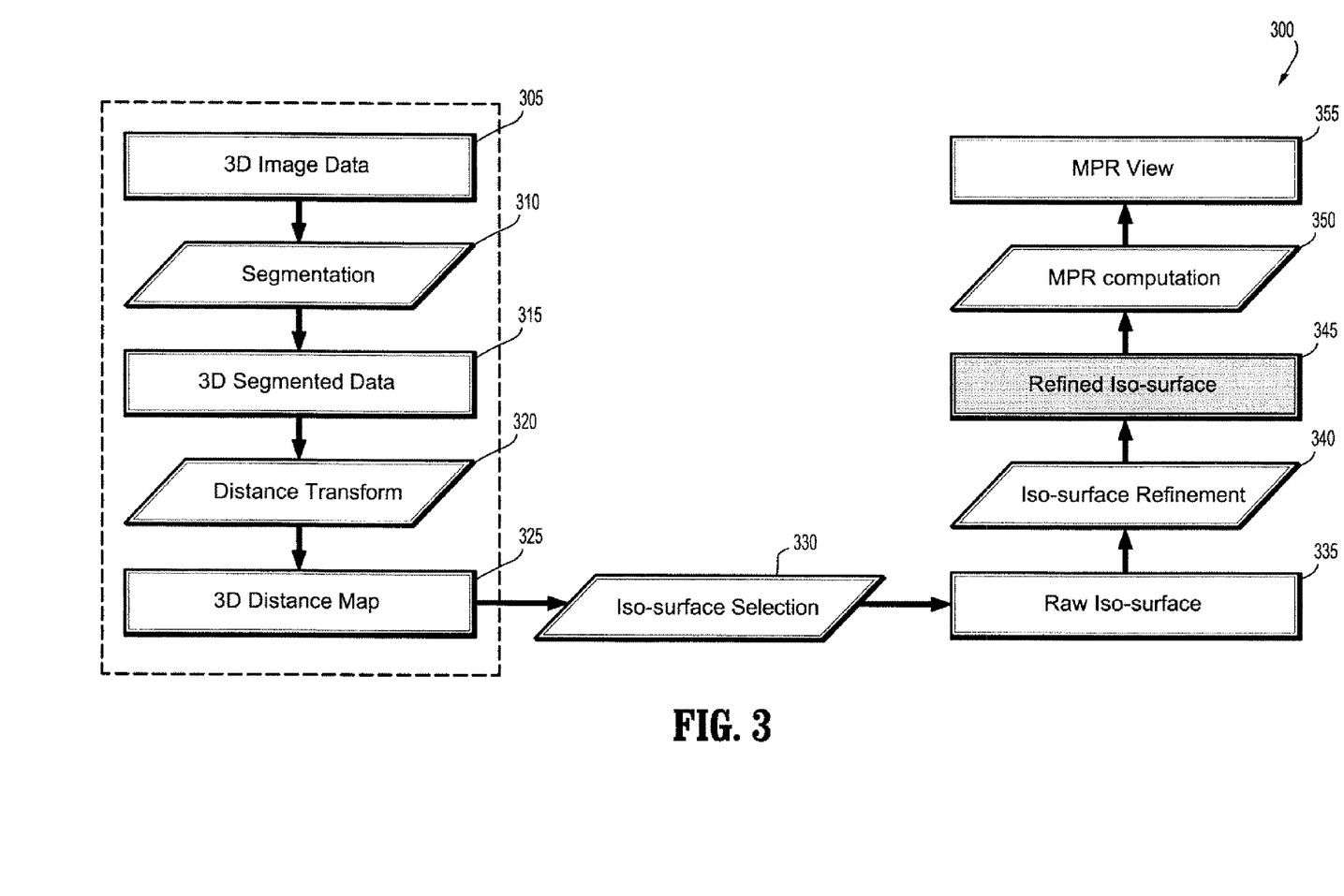
FIG. 3 illustrates a computer-implemented method of visualizing an image 300 according to an exemplary embodiment of the present invention.
Figure 4:
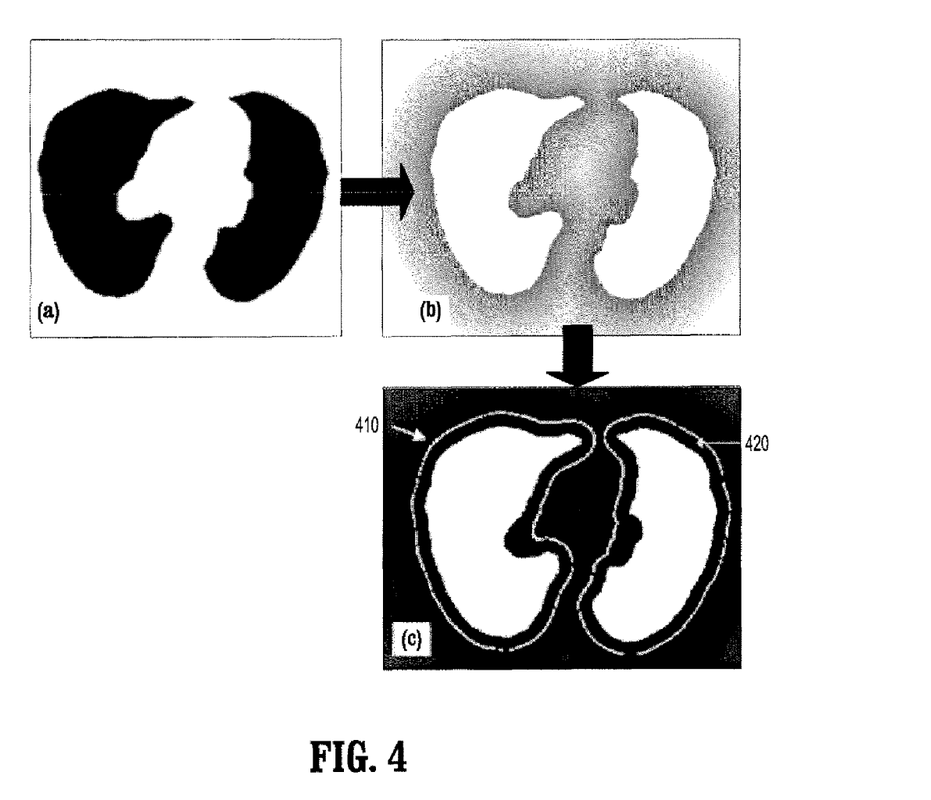
FIG. 4 illustrates an exemplary segmentation, an exemplary distance map, and exemplary iso-surfaces.

FIG. 3 illustrates a method of visualizing an image, according to an exemplary embodiment of the present invention. FIG. 4 illustrates a 2D slice of an exemplary segmentation, an exemplary distance map, and exemplary iso-surfaces. The present embodiment will be discussed in more detail with respect to FIG. 3 and FIG. 4.

Referring to FIG. 3, 3D image data is received in an initial step (305). It is preferred that the 3D image data be a medical image of anatomical objects such as, for example, the lungs, heart, brain, etc. However, the present invention is not limited to anatomical objects and may be generalized to images of greater dimensions or different imaging modalities. The 3D image is a digital image, such as, for example, a computed tomography (CT) image.

Next, a segmentation (310) is performed on the 3D image data to isolate an object of interest to generate one or more segmented structures of SD segmented data 315. For example, the object of interest can be the lungs, head, heart, etc. FIG. 4a illustrates an example of segmented data for the lungs, which includes a first segmented structure, representative of a first lung of a pair of lungs and a second segmented structure, representative of a second lung of the pair. The segmentation may be performed by a region growing operation, followed by any appropriate post processing, including morphological operations, such as for example, erosion, dilation, opening, etc. Referring, to FIG. 4a, the segmented structures appear darker than the surrounding data. Performing the segmentation to generate the segmented structures may include applying an evolving surface, such as a level set function to the 3D image.

Next a distance transform is applied to the 3D segmented data 315 to label all voxels based on their distances to the segmented structures (320) to generate a 3D distance map 325. FIG. 4b illustrates an example of the resulting 3D distance map 325. Referring to FIG. 4b, the voxels of the image that are part of the segmented structures appear white. The voxels just outside the segmented structures appear darkest because they are closest in distance to their respective segmented structures. As the voxels get further away from their respective segmented structures, they become lighter to indicate that they are further away in distance.

The distance transform may be signed to assign both negative and positive values to distinguish between inner and outer regions of the segmented structures. The distance map may also be formed by applying a fast marching method to the segmented structures.

A raw iso-surface 335 is then generated by selecting a specific value from the 3D distance map (330). FIG. 4c illustrates exemplary raw iso-surfaces 410 and 420. The value directly describes the distances that the iso-surfaces 410 and 420 are from their respective segmented structures. An iso-surface is comprised of a set of points with equivalent distance values. Different iso-surfaces can be generated by merely selecting a new distance value.

A chosen one of the raw iso-surfaces can be used as a direct basis to define a curved MPR reconstruction of the data. However, the chosen raw iso-surface 335 may not be ideal for direct visualization and therefore may need some refinement. A refined iso-surface 345 may be generated by refining the raw iso-surface 335 (340). The refinement step adjusts the properties of the iso-surface specific to the application, such as topological or shape changes. The refined iso-surface 345 is used to produce a curved MPR view 355 during a curved MPR computation (350). The curved MPR computation may operate on the refined iso-surface 345 and deformations of the refined iso-surface 345 to generate the resulting curved MPR view.

Further slices in the reformation may be obtained by defining a different initial iso-surface and repeating the above process. This causes the next "slice" in the reformation to be generated. Another iso-surface may be generated by performing another distance transform on the refined iso-surface to avoid or eliminate the refinement step. This is also considered a deformation of the surface definition.

Multiple MPR views may then be gathered to form an average, Minimum Intensity Projection (MIP), Maximum Intensity Projection (MPR), or some other function of the data, thereby reducing the number of slices necessary for viewing. The slices can be combined into a new reformatted volume that can be saved for quick viewing or rendering. In addition to viewing, these object-centric reformations can be used as a basis for Computer Aided Detection (CAD) methods or other image processing methods such as segmentation.

Referring to FIG. 4, for the purposes of visualizing the ribs, the iso-surfaces 410 and 420 would need to be processed such that only a single connected surface is present. This can be accomplished by connecting the surfaces at their closest point or ensuring that the initial lung segmentation consists of one component. The result would allow the visualization of the ribs from the computed MPR views along with the vertebrae. Rib segmentation and centerline determination is not necessary. As each slice is advanced, the next distance value may be selected to define a new iso-surface to process. A distance transform from a processed iso-surface can also be used as a basis for generating further iso-surfaces to improve processing time.

Figure 5:
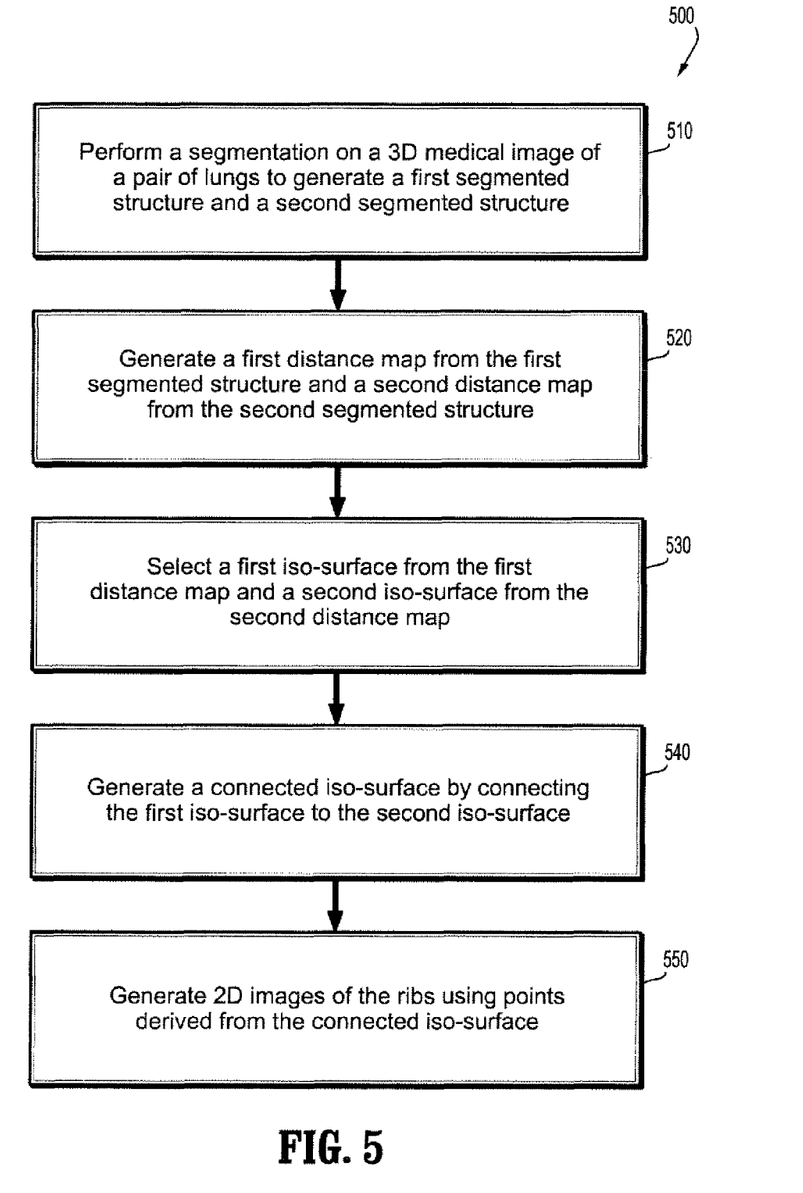
FIG. 5 illustrates a computer-implemented method of visualizing a 2D image of the ribs 500, according to an exemplary embodiment of the present invention.

FIG. 5 illustrates a computer-implemented method of visualizing a 2D image of the ribs, according to an exemplary embodiment of the present invention. A segmentation is performed on a 3D medical image of a pair of lungs to generate a first segmented structure and a second segmented structure (510). A first distance map is then generated from the first segmented structure and a second distance map is generated from the second segmented structure (520). A first iso-surface is selected from the first distance map and a second iso-surface is selected from the second distance map (530). A connected iso-surface is generated by connecting the first iso-surface to the second iso-surface (540). The first iso-surface may be connected to the second iso-surface along their closest or intersecting points. A 2D image of the ribs is then generated using points derived from the connected iso-surface (550).

The resultant images would be straightened views of the ribs since they closely follow the shape of the lungs. When there is damage to the ribs or lungs causing a disruption, the close proximity may still allow for sufficient visualization. Since the surface can be taken in and around the lung, the images can be used to view the aorta as well as bleeding or pleural effusion, which are common in acute care cases. In addition to viewing the ribs, the images obtained may be used for automated segmentation and centerline determination of the ribs. Since the reformatted data with iso-surfaces outside of the lungs will most likely only contain the ribs, the problem may be greatly simplified. In addition, for any tracking approach used to segment the ribs or determine rib centerlines, the ribs are already straightened, making the predicted tracking direction simpler.

Exemplary embodiments of the present invention may be used for Pulmonary Embolism (PE) detection. Previous methods of PE visualization with MPR views involved rotating planes about the heart to see distal and proximal vessels about the heart. By using a signed distance transform or just taking the internal distance of the lung segmentations, MPR views based on only proximal to distal vessels can be created. This type of visualization may allow the radiologist to only focus on specific regions for clots (proximal to distal).

Exemplary embodiments of the present invention may also be used detect abnormalities of the brain and skull. Obtaining a segmentation of the skull allows for reformations based on segmentations based on the shape of the skull. Regions of the brain can then be viewed through an elliptical iso-surface. In addition, an evolving level-set function can be applied to segmentations of the sulci and the gyri of the brain and iso-surfaces of the evolving level-set can be used to remap a volume into a flatted space.

Although the exemplary embodiments of the present invention have been described in detail with reference to the accompanying drawings for the purpose of illustration, it is to be understood that the that the inventive processes and systems are not to be construed as limited thereby. It will be readily apparent to those of ordinary skill in the art that various modifications to the foregoing exemplary embodiments can be made therein without departing from the scope of the invention as defined by the appended claims, with equivalents of the claims to be included therein.

What is claimed is:

1. A computer-implemented method for detecting abnormalities, comprising:

performing a segmentation on a 3D image to generate a first segmented structure and a second segmented structure that is distinct from the first;

generating a first distance map from the first segmented structure and a second distance map from the second segmented structure;

generating a first iso-surface from the first distance map and a second iso-surface from the second distance map, wherein the first iso-surface entirely surrounds a first boundary contour that bounds the first segmented structure, and space is present between the first iso-surface and the first boundary contour, wherein the second iso-surface entirely surrounds a second boundary contour that bounds the second segmented structure, and space is present between the second iso-surface and the second boundary contour;

generating a connected surface by connecting closest respective points of the first iso-surface and the second iso-surface together;

generating a series of 2D images using the connected surface; and using the 2D images to detect abnormalities.

2. The method of claim 1, wherein each of the 2D images is generated by sampling points on the connected surface and deformations of the connected surface within the 3D image.

3. The method of claim 1, further comprising using the 2D images to generate segmentations of additional anatomic structures.

4. The method of claim 1, wherein performing a segmentation on the 3D image to generate each segmented structure comprises applying a level set function to the 3D image.

5. The method of claim 1, wherein performing a segmentation on the 3D image to generate each segmented structure comprises performing a seeded region growing operation on the 3D image.

6. The method of claim 1, wherein each distance map is obtained by applying a fast marching method to the corresponding segmented structure.

7. The method of claim 1, wherein the first segmented structure is representative of a first lung of a pair of lungs and the second segmented structure is representative of a second lung of the pair and the 2D images forms an image of ribs.

8. The method of claim 1, wherein the 3D image comprises, a computed tomography (CT) image.

9. The method of claim 1, further comprising, stacking the series of 2D images to form a new 3D volume.

10. The method of claim 1, wherein the first and second iso-surfaces do not surround one another.

11. A computer implemented-method for generating a visualization of a series of 2D images of ribs, comprising:

performing a segmentation on a 3D image of a pair of lungs to generate a first segmented structure and a second segmented structure;

generating a first distance map from the first segmented structure and a second distance map from the second segmented structure;

selecting a first iso-surface from the first distance map and a second iso-surface from the second distance map, wherein the first iso-surface entirely surrounds a first boundary contour that bounds the first segmented structure, each point of the first iso-surface is spaced apart a first distance away from a corresponding point of the first boundary contour, and wherein the second iso-surface entirely surrounds a second boundary contour that bounds the second segmented structure, and each point of the second iso-surface is spaced apart a second distance away from a corresponding point of the second boundary contour;

generating a connected surface by connecting the first iso-surface to the second iso-surface; and generating 2D images of the ribs using points derived from the connected surface.

12. The method of claim 11, wherein the visualization is used for a computer aided diagnosis application to detect abnormalities of the ribs.

13. The method of claim 11, wherein the visualization is used as a basis to perform a segmentation of the ribs.

14. The method of claim 11, wherein generating a first distance map from the first segmented structure and a second distance map from the second segmented structure comprises, applying a fast marching method to the first segmented structure and the second segmented structure.

15. The method of claim 11, wherein the 3D image comprises, a computed tomography (CT) image.

16. The method of claim 11, wherein the first iso-surface is connected to the second iso-surface by connecting closest respective points of the first iso-surface and the second iso-surface together.

17. The method of claim 11, wherein the first and second distances are substantially the same.

18. The method of claim 11, wherein the first and second iso-surfaces do not surround one another.

19. A computer-implemented method for generating a visualization of a series of 2D images, comprising:

performing a segmentation on a 3D image to generate a first segmented structure and a second segmented structure that is distinct from the first;

generating a first distance map from the first segmented structure and a second distance map from the second segmented structure;

generating a first iso-surface from the first distance map and a second iso-surface from the second distance map, wherein the first iso-surface entirely surrounds a first boundary contour that bounds the first segmented structure, and space is present between the first iso-surface and the first boundary contour, wherein the second iso-surface entirely surrounds a second boundary contour that bounds the second segmented structure, and space is present between the second iso-surface and the second boundary contour;

generating a connected surface by connecting the first and the second iso-surface together; and generating a series of 2D images from the connected surface.

20. The method of claim 19, wherein the first and second iso-surfaces do not surround one another.

* * * * *